United States Patent
Dence (10) Patent No.: US 6,394,532 B1
(45) Date of Patent: May 28, 2002

(54) PIVOTING DEVICE FOR PICK-UP TRUCK CAMPER SHELLS

(76) Inventor: Ralph Dence, 31017 Camino Verde, Temecula, CA (US) 92591

( * ) Notice: Subject to any disclaimer, the term of this patent is extended or adjusted under 35 U.S.C. 154(b) by 0 days.

(21) Appl. No.: 09/961,724

(22) Filed: Sep. 24, 2001

Related U.S. Application Data (63) Continuation-in-part of application No. 09/637,669, filed on Aug. 14, 2000, now abandoned.

(51) Int. Cl.[7] .................................................. B60P 7/02
(52) U.S. Cl. .................... 296/165; 296/100.06; 296/183
(58) Field of Search .............................. 296/165, 26.06, 296/100.06, 100.07, 164, 100.1, 100.02, 26.04, 183

(56) References Cited

U.S. PATENT DOCUMENTS

| | | | | |
|---|---|---|---|---|
| 3,924,365 A | * | 12/1975 | Orberg ........................ 135/116 |
| 4,566,729 A | * | 1/1986 | Magnino .................. 135/88.13 |
| 4,629,243 A | * | 12/1986 | Jensen .......................... 16/229 |
| 4,819,981 A | * | 4/1989 | Moe et al. ............. 296/100.07 |
| 4,948,311 A | * | 8/1990 | St. Pierre et al. ........... 248/499 |
| 5,102,185 A | * | 4/1992 | Lake ...................... 296/100.07 |
| 5,353,826 A | * | 10/1994 | Davis, Sr. .................... 135/119 |
| 5,403,061 A | * | 4/1995 | Micknowicz .......... 296/100.06 |
| 5,558,392 A | * | 9/1996 | Young .......................... 224/553 |
| 5,595,418 A | * | 1/1997 | Medlin .................. 296/100.08 |
| 5,704,681 A | * | 1/1998 | Lambden ............... 296/100.06 |
| 5,951,095 A | * | 9/1999 | Herndon ................ 296/100.09 |
| 6,007,137 A | * | 12/1999 | Lambden ............... 296/100.02 |
| 6,086,134 A | * | 7/2000 | Cravens et al. ........ 296/100.06 |

* cited by examiner

Primary Examiner—Stephen T. Gordon
Assistant Examiner—Patricia Engle
(74) Attorney, Agent, or Firm—Goldstein Law Office P.C.

(57) ABSTRACT

A pivoting device for pick-up truck camper shells including a pair of support posts selectively coupled with respect to the forward and rearward ends of one of the opposed sides of the camper shell. The support posts each have a short lower section and a long upper section. The short lower sections have lower ends dimensioned for being received within the forward and rearward post holes of the truck bed. The long upper sections, extend upwardly at an inward angle from the short lower sections. The long upper sections each have an upper end securable to the camper shell for elevating the side of the camper shell above the truck bed. A pivot rod assembly is secured to each of the opposed side walls of the truck bed for selectively holding the camper shell to the side walls of the truck bed.

4 Claims, 6 Drawing Sheets

PIVOTING DEVICE FOR PICK-UP TRUCK CAMPER SHELLS

CROSS REFERENCES AND RELATED SUBJECT MATTER

This application relates to subject matter contained in patent application Ser. No. 09/637,669, filed in the United States Patent Office on Aug. 14, 2000, now abandoned and claims priority as a continuation-in-part application.

BACKGROUND OF THE INVENTION

The present invention relates to a pivoting device for pick-up truck camper shells and more particularly pertains to allowing a camper shell to pivot upwardly on one side and remain in the upward position, for easy access to an interior of the pick-up truck bed.

The use of truck bed mounts is known in the prior art. More specifically, truck bed mounts heretofore devised and utilized for the purpose of protecting the contents of a truck bed are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,948,311 to St. Pierre discloses a tie down fitting for removably mounting within stake holds in a wall section of a pickup truck, to secure structures such as a tent. U.S. Pat. No. 3,924,365 to Orberg discloses means for attaching a curtain support shell to form a sleeping compartment for a vehicle. U.S. Pat. No. 4,566,729 to Magnito discloses a tent for a pickup truck with means to quickly construct the device. U.S. Pat. No. 5,353,826 to Davis, Sr. discloses a removable tent top attachable by a series of pins.

While these devices fulfill their respective, particular objective and requirements, the aforementioned patents do not describe a pivoting device for pick-up truck camper shells for allowing a camper shell to pivot upwardly for easy access to an interior of the pick-up truck bed.

In this respect, the pivoting device for pick-up truck camper shells according to the present invention substantially departs from the conventional concepts and designs of the prior art, and in doing so provides an apparatus primarily developed for the purpose of allowing a camper shell to pivot upwardly for easy access to an interior of the pick-up truck bed.

Therefore, it can be appreciated that there exists a continuing need for a new and improved pivoting device for pick-up truck camper shells which can be used for allowing a camper shell to pivot upwardly for easy access to an interior of the pick-up truck bed. In this regard, the present invention substantially fulfills this need.

SUMMARY OF THE INVENTION

In the view of the foregoing disadvantages inherent in the known types of truck bed mounts now present in the prior art, the present invention provides an improved pivoting device for pick-up truck camper shells. As such, the general purpose of the present invention, which will be described subsequently in greater detail, is to provide a new and improved pivoting device for pick-up truck camper shells which has all the advantages of the prior art and none of the disadvantages.

To attain this, the present invention essentially comprises a pair of support posts removably coupled between the camper shell and one of the opposed sides of the truck bed. The support posts each have a short lower section and a long upper section. The short lower sections each have a lower end dimensioned for being received within the forward and rearward post holes of the truck bed. The long upper sections extend upwardly at an inward angle from the short lower sections. The long upper sections each have an upper end securable to the camper shell for elevating the side of the camper shell above the truck bed. A Chain is secured between one of the side walls of the truck bed and one of the sides of the camper shell. A pivot rod assembly is secured at the side wall of the truck bed opposite the pair of support posts. The pivot rod assembly is comprised of a pivot rod having opposed ends, and a pair of vertical support brackets secured within posts holes in the side wall. The support brackets each have a tab extending vertically upward therefrom. Each tab has a pair of apertures for receiving the pivot rod. The pivot rod has a lever extending outwardly therefrom inwardly of one of the opposed ends thereof. The pivot rod assembly helps maintain the camper shell against the truck bed and selectively allows it to be raised therefrom.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pivoting device for pick-up truck camper shells which has all the advantages of the prior art truck bed mounts and none of the disadvantages.

It is another object of the present invention to provide a new and improved pivoting device for pick-up truck camper shells which may be easily and efficiently manufactured and marketed.

It is a further object of the present invention to provide a new and improved pivoting device for pick-up truck camper shells which is of durable and reliable construction.

An even further object of the present invention is to provide a new and improved pivoting device for pick-up truck camper shells which is susceptible of a low cost of manufacture with regard to both materials and labor, and which accordingly is then susceptible of low prices of sale to the consuming public, thereby making such a pivoting device for pick-up truck camper shells economically available to the buying public.

Even still another object of the present invention is to provide a new and improved pivoting device for pick-up truck camper shells for allowing a camper shell to pivot upwardly for easy access to an interior of the pick-up truck bed.

Lastly, it is an object of the present invention to provide a new and improved pivoting device for pick-up truck camper shells including a pair of support posts removably coupled with respect to the forward and rearward ends of the opposed sides of the camper shell to prop up the camper shell along one of the opposed sides. A pivot rod assembly includes a pivot rod and a support bracket. The support bracket is secured within the post holes and has an upper tab which each have a pair of apertures. The pivot rod is selectively securable in the apertures to hold the camper shell against the pick-up truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

With reference now to the drawings, and in particular, to FIGS. 1 through 9 thereof, the preferred embodiment of the new and improved pivoting device for pick-up truck camper shells embodying the principles and concepts of the present invention and generally designated by the reference number 10 will be described.

Specifically, it will be noted in the various Figures that the device relates to a pivoting device for pick-up truck camper shells for allowing a camper shell to selectively pivot upwardly along one of its opposed sides into an upward position, for easy access to an interior of the pick-up truck bed, and to be maintained in the upward position. In addition, the camper shell is also selectively held in the lowered position by the present invention. In its broadest context, the device consists of a pair of support posts, at least one chain, and a pivot rod assembly. Such components are individually configured and correlated with respect to each other so as to attain the desired objective.

Figure 1:
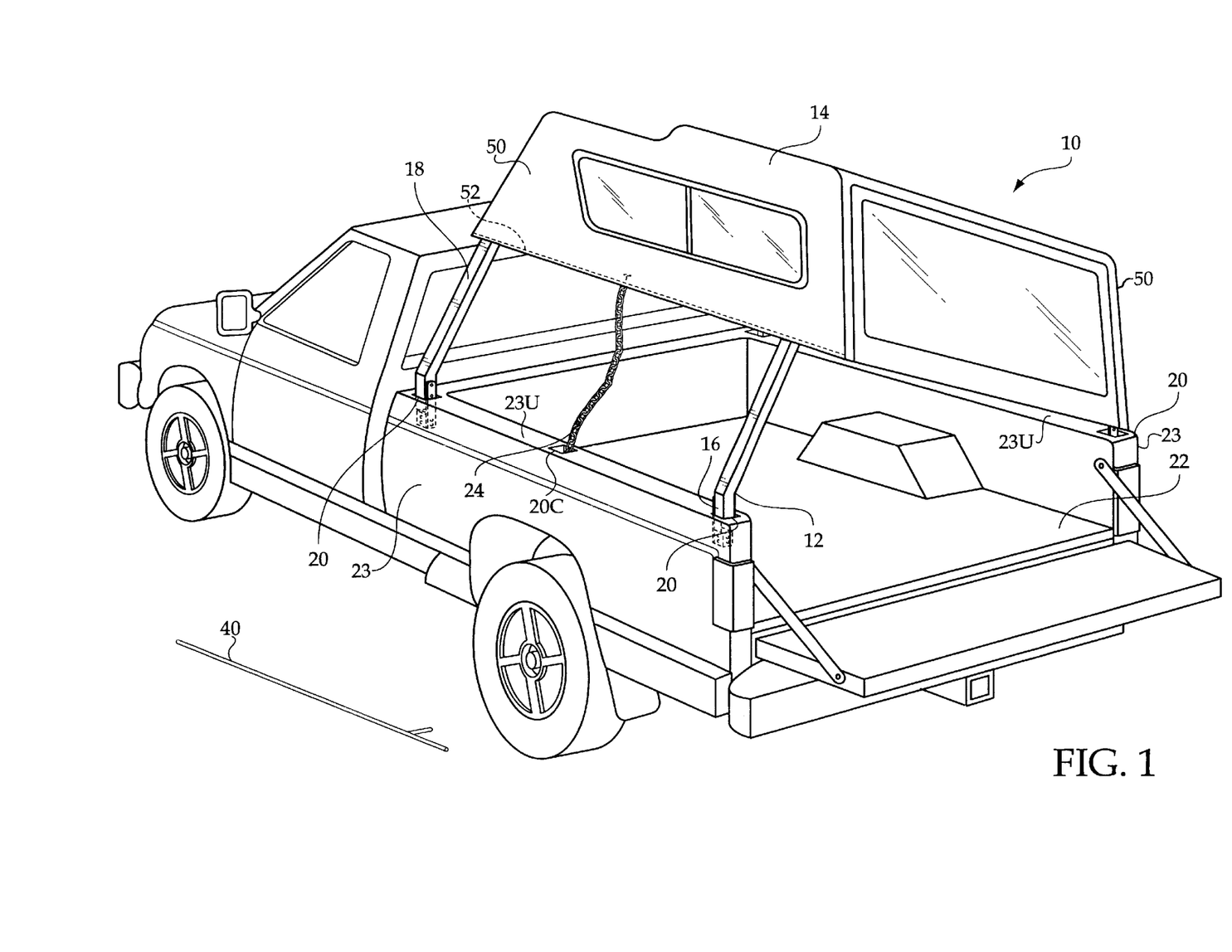
FIG. 1 is a perspective view of the preferred embodiment of the pivoting device for pick-up truck camper shells constructed in accordance with the principles of the present invention.

The present invention is used in conjunction with a truck bed 22, having a pair of longitudinally extending opposed sides 23, each having a side upper surface 23U. Several post holes 20 are located in the side upper surfaces 23U—and are generally positioned rearwardly, forwardly, and centered therebetween, as seen in FIG. 1. A camper shell 14 is dimensioned to extend across and cover the truck bed 22, and has a pair of sides 50, each having a lower flange 52.

Figures 4, 5:
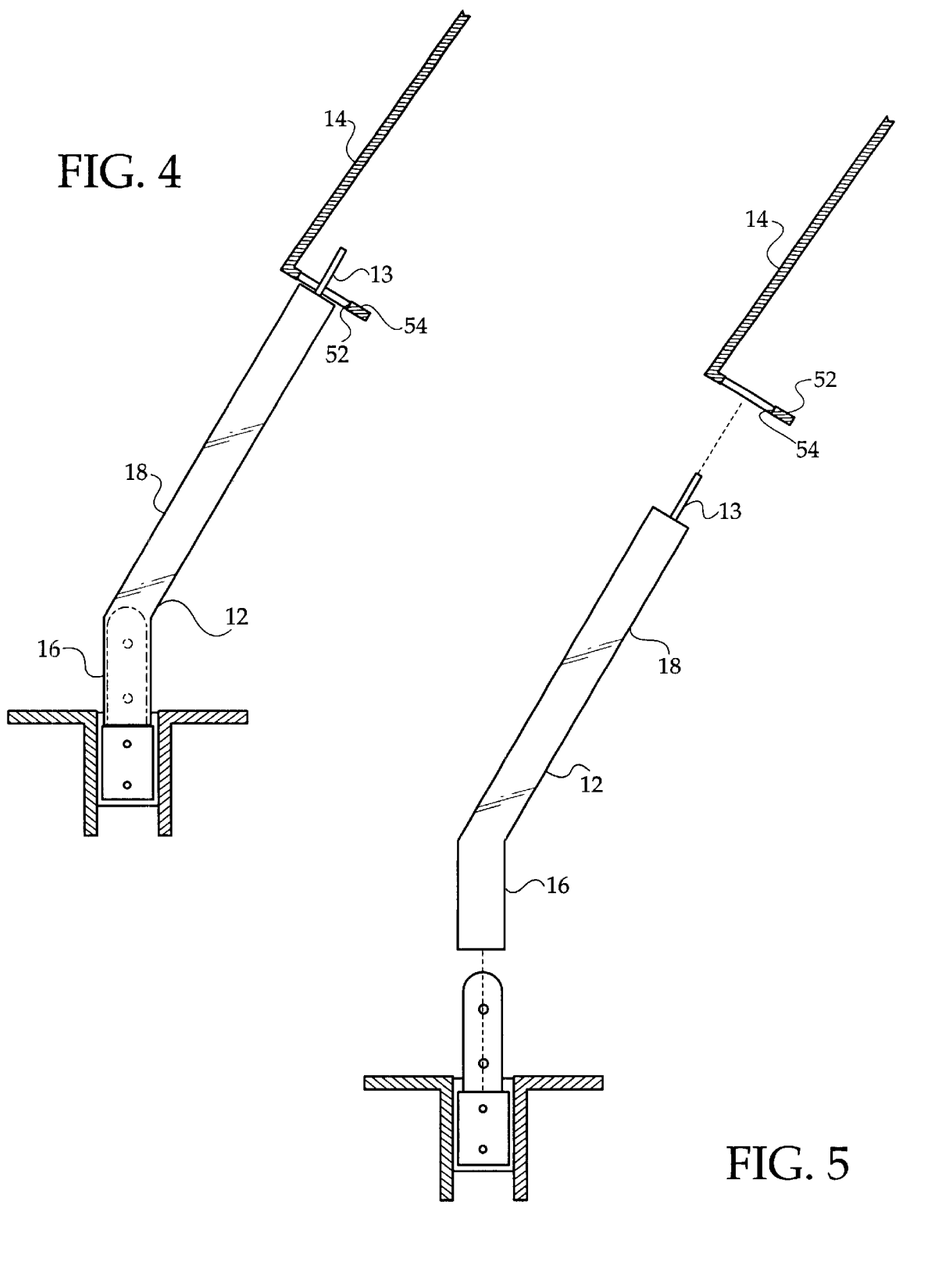
FIG. 4 is a cross sectional view, illustrating one of the support posts holding the camper shell in the upward position.
FIG. 5 is an assembly view, similar to FIG. 5, illustrating how the support post is positioned within one of the post holes, to hold the camper shell in the upward position.

According to the present invention the pair of support posts 12 are used to maintain the camper shell in the upward position. As such, the support posts 12 are selectively and removably coupled with respect to the forward and rearward ends of one of the opposed sides of the camper shell 14. The support posts 12 each have a short lower section 16 and a long upper section 18. The short lower sections 16 are dimensioned for being received within the forward and rearward post holes 20 of the truck bed 22. The long upper sections 18 extend upwardly at an inward angle from the short lower sections 16. The preferred angle is substantially twenty degrees. The long upper sections 18 each have an upper end securable to the camper shell 14 for elevating the side of the camper shell 14 above the truck bed 22. Note FIGS. 4, 5, 8, and 9. In particular, a post pin 13 extends axially upward from the upper section 18. In addition, as seen in FIGS. 4 and 5, the lower flange 52 has a lower flange opening 54. The pin 13 extends through the lower flange opening 54 and thereby prevents the camper shell from slipping off the upper section 18 of the support post 12.

Figure 6:
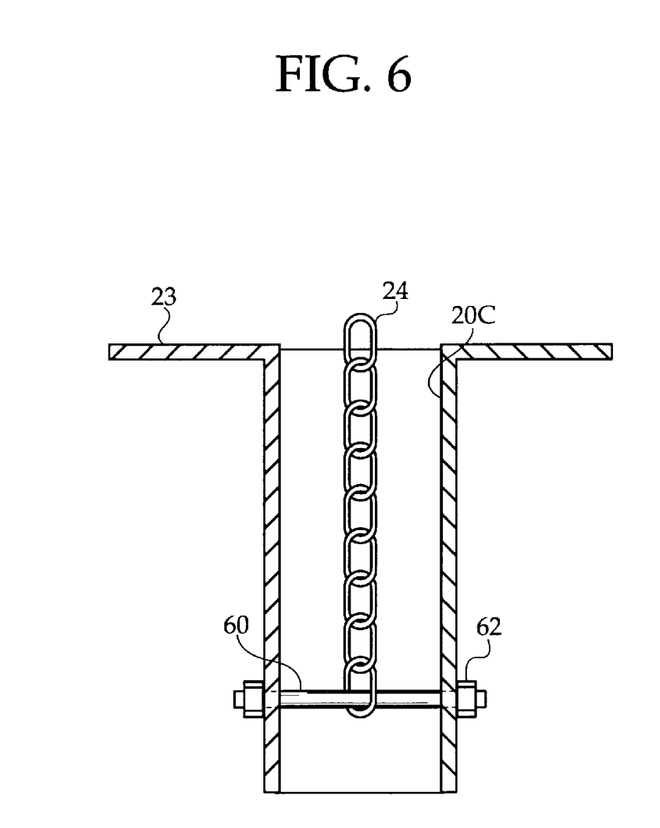
FIG. 6 is a cross sectional view, illustrating how one of the chains may be secured within one of the post holes.

The chain 24 is secured between one of the opposed side wall 23 of the truck bed 22 and the lower flange 52 of the camper shell. The chain 24 is cut or adjusted to a predetermined length so as to prevent the camper shell 14 from being raised too far and falling off the support post. Additionally, the chain 24 will prevent the camper shell 14 from being blown off of the truck bed 22 during windy conditions. A preferred mounting method is attach the chain 24 to one of the post holes 20, using a bolt 60 and nut 62 as seen in FIG. 6. Preferably a central post hole 20 should be used, as seen in FIG. 1. Chain 24 can also be attached to nut outside the post hole.

The pivot rod assemblies 26 are secured to the side walls 23 of the truck bed 22. The pivot rod assembly 26 fastens the lower flange 52 to the side upper surface 23U, yet allows one of the lower flanges 52 to be lifted in accordance with the invention. Accordingly, the pivot rod assembly includes a support bracket 28 and a pivot rod 40. The support brackets 28 are mounted in the post holes, such that each of the side walls 23 has two support brackets. The support brackets 28 each have a lower end 36 and an upper end 34, such that the lower end 36 is mounted within the post holes 20. Accordingly the lower end 36 is a square cross-sectioned tube which is dimensioned to fit snugly within the post hole 20, and mounting holes 35 are provided to facilitate attachment of the lower end 36 to the post hole 20. In addition, the upper end 34 comprises a tab 30 extending vertically upward therefrom. Each tab 30 is substantially flat, and when the support bracket 28 is mounted in one of the post holes 20, said tab extends transverse to the truck bed 22. The tab 30 has a pair of apertures 38, including an upper aperture 38U and a lower aperture 38L. Among the two support brackets 28 mounted to each of the side walls 23, the upper apertures 38U are coaxially aligned with each other, and the lower apertures 38L are coaxially aligned with each other.

The pivot rod 40 is an elongated bar which is capable of extending through the apertures 38 of the support brackets 28.

Figure 2:
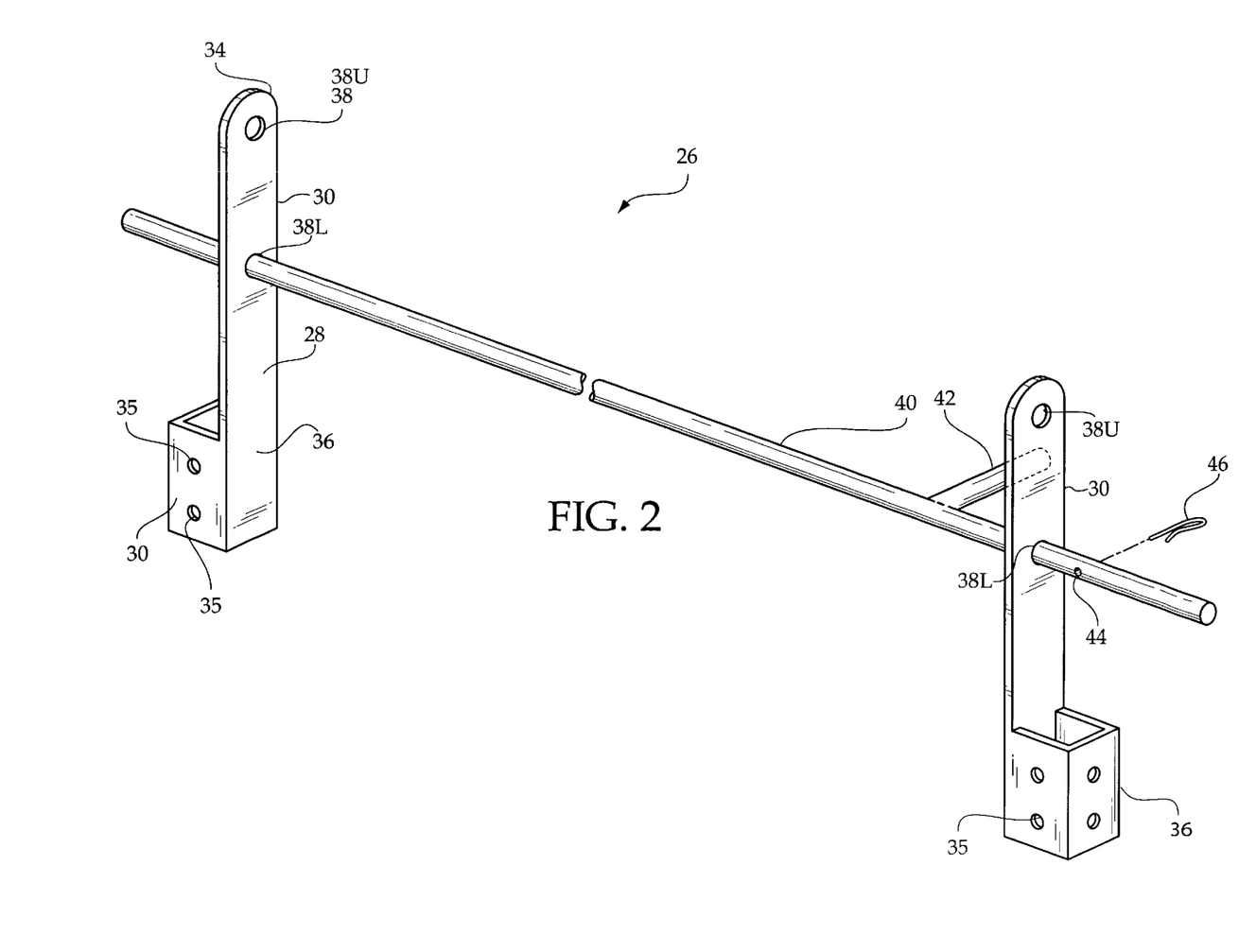
FIG. 2 is a perspective view of the pivot rod assembly of the present invention.

The support rod 40 has a lever 42 extending outwardly therefrom inwardly of one of the opposed ends thereof. Once extended through apertures 32 in two of the support brackets 28 as seen in FIG. 2, the lever 42 prevents the support rod 40 from becoming accidentally removed from the support brackets 28 in one direction. The pivot rod assembly 26 includes a cotter pin 46, and the pivot rod 40 has a cotter pin bore 44, such that when the cotter pin 46 is in the cotter pin bore 44, the cotter pin 46 prevents the support rod 40 from sliding in one of the apertures 32 past said cotter pin 46. Accordingly, longitudinal movement of the pivot rod 40 is limited by the lever 42 on one side of the tab 30, and the cotter pin 46 on another side of the tab 30.

Figure 3:
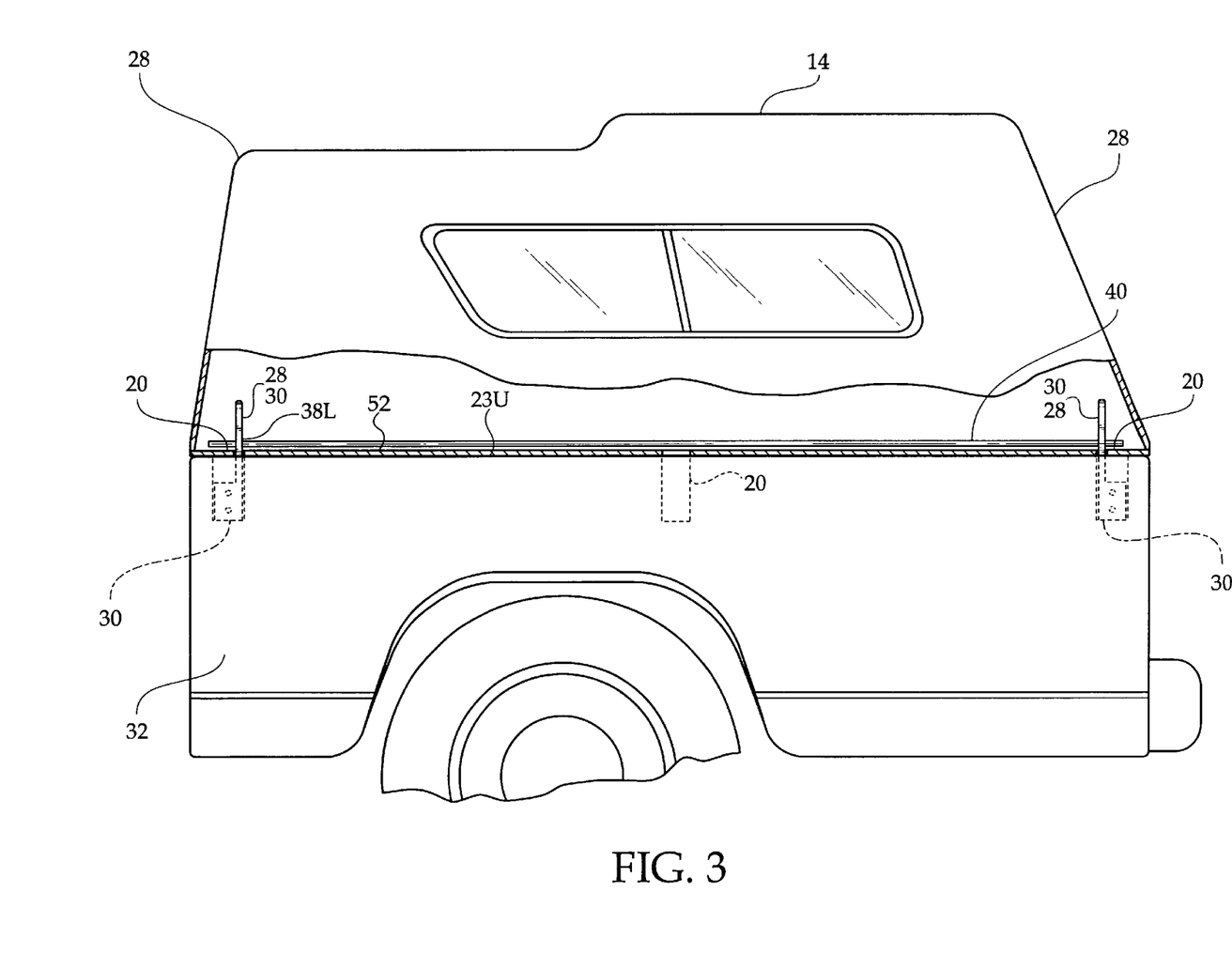
FIG. 3 is a side view of the present invention illustrating securement of camper shell to the truck bed sides using the pivot rod assembly.

Accordingly, during transport of the truck having the camper shell mounted thereon, the lower flanges 52 rest against the side upper surfaces 23U, with the tabs 30 extending through the lower flange openings 54 therein, as seen in FIG. 3. The pivot rod 40 extends through the lower apertures 38L, and thereby prevents the camper shell from detaching from the bed sides 23. The lever 42 and cotter pin 46 prevent the rod from inadvertently dislodging.

Figure 7:
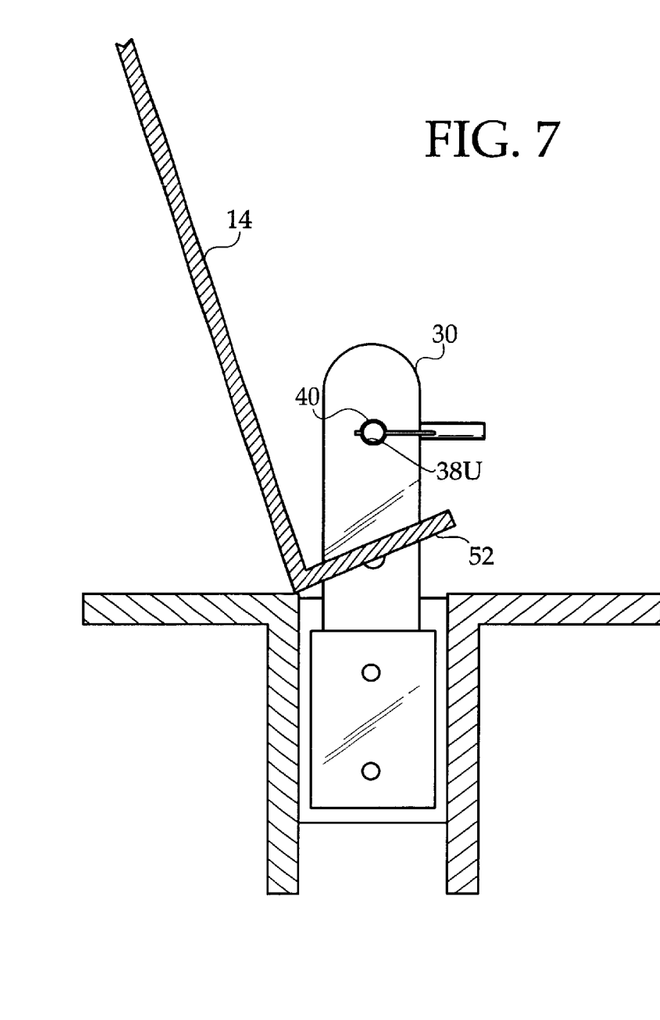
FIG. 7 is a cross sectional view, illustrating how the pivot rod is moved to the upper aperture in the tab of the support bracket, to prevent interference between the pivot rod and the lower flange of the camper shell.
Figure 8:
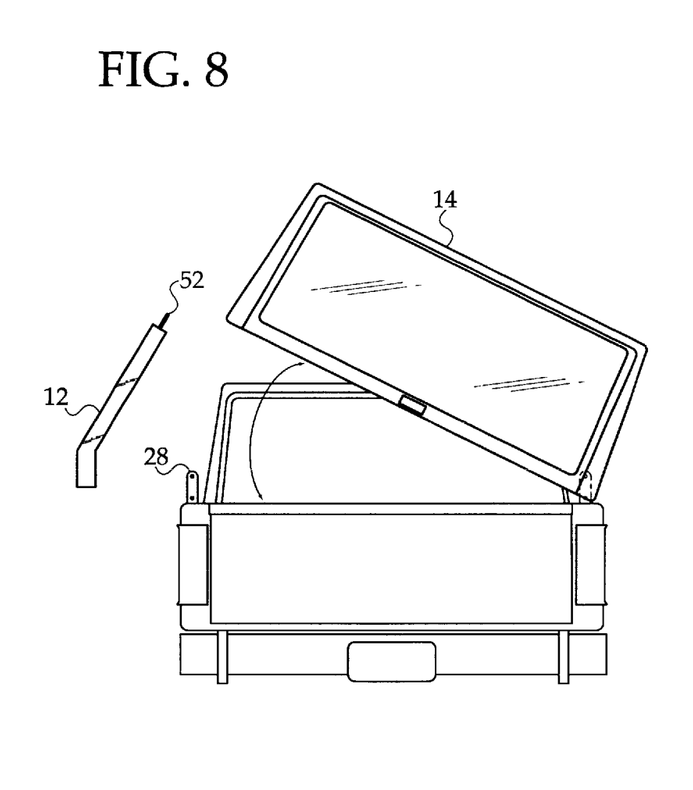
FIG. 8 is a rear elevational view, illustrating the camper shell pivoted into the upward position, wherein the support post is about to the used to hold the camper shell in the upward position.
Figure 9:
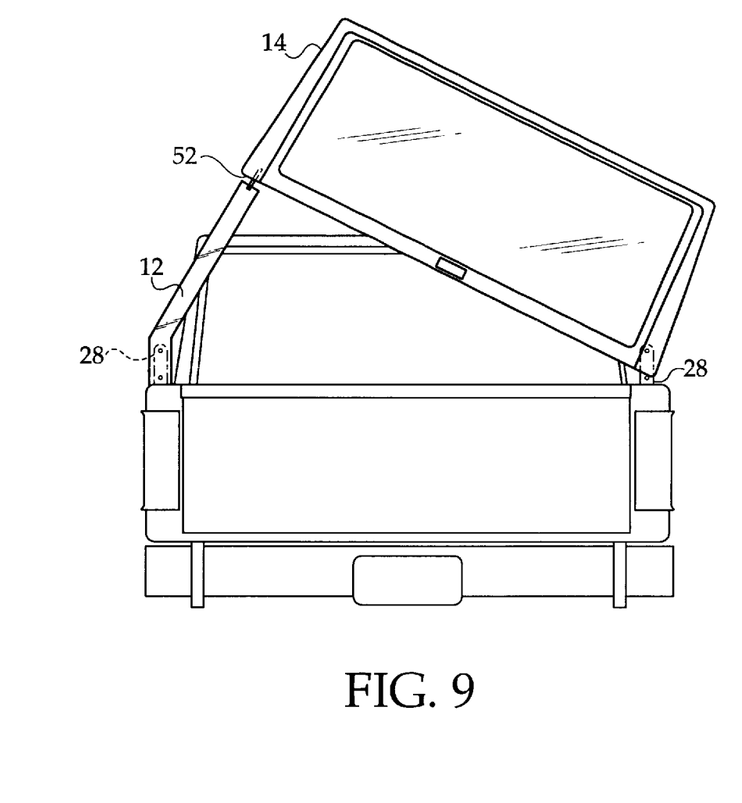
FIG. 9 is a rear elevational view, illustrating the camper shell held in the upward position by the support posts.

However, when it is desirable to pivot the camper shell upward, at the side to be lifted, the pivot rod 40 is removed from the tabs 30 on that side 23 of the truck bed to fully free the camper shell thereat. On the opposite side 23, it is still desirable to hold the camper shell 14 to the truck bed 22. However, the lower flange 52 thereat requires room to pivot, to avoid being the lower flange 52. Accordingly, the pivot rod 40 is first moved to the upper apertures 38U in its associated support brackets 28, as seen in FIG. 7. Then, the camper shell 14 may be pivoted upward, as seen in FIGS. 7, 8, and 9.

It should be noted that the pivot rod 40 is shown as having arbitrary length. In general, its length is determined by the distance between post holes in the truck in which it is mounted. However, to make the pivot rod 40 universal between various truck types, the pivot rod 40 can be made telescoping in various ways, so that it can be adjusted to function with the post hole spacing of the truck with which it is used.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A pivoting device for pick-up truck camper shells for allowing a camper shell to be pivoted and held in a upward position for easy access to an interior of the pick-up truck bed, the truck bed including a pair of longitudinally extending opposed side walls having side upper surfaces, the side walls each having a forward and rearward post hole, the camper shell having a forward end and a rearward end and camper shell sides, each camper shell side having a lower flange, the device comprising, in combination:

a pair of support posts each having a short lower section and a long upper section, the short lower sections having lower ends dimensioned for being received within the forward and rearward post holes of the truck bed, the long upper sections extending upwardly at an inward angle from the short lower sections, the long upper sections each having an upper end having a pin for extending through an aperture of one of the lower flanges of the camper shell for elevating the side of the camper shell above the truck bed;

a chain securable between one of the opposed side walls of the truck bed and one of the lower flanges of the camper shell;

a pair of pivot rod assemblies, each pivot rod assembly mountable along one of the sides of the truck bed, each pivot rod assembly having a pivot rod and a pair of support brackets, each support bracket having a lower end which is mountable within one of the post holes and an upper end having a tab which is capable of extending through an aperture of one of the lower flanges, each tab having an upper aperture and a lower aperture, the pivot rod capable of extending horizontally through apertures in the tabs of the support brackets located on the same side of the truck bed to prevent the camper shell from lifting from the truck bed sides until the rod is removed from the apertures.

2. A pick-up truck camper shell pivoting device, comprising:

a truck bed having a pair of side walls, each side wall having a side upper surface, each side wall having a forward and rearward post hole;

a camper shell having camper shell sides, each camper shell side having a lower flange, each lower flange having a pair of lower flange openings;

a pair of support posts each having a short lower section and a long upper section, the short lower sections having lower ends dimensioned for being received within the forward and rearward post holes of the truck bed, the long upper sections extending upwardly at an inward angle from the short lower sections, the long upper sections each having an upper end having a pin for extending through one of the lower flange openings of the camper shell for elevating the side of the camper shell above the truck bed;

a pair of pivot rod assemblies, each pivot rod assembly mounted along one of the sides of the truck bed, each pivot rod assembly having a pivot rod and a pair of support brackets, each support bracket having a lower end which is mounted within one of the post holes and an upper end having a tab which is capable of extending through one of the lower flanges, each tab having an upper aperture and a lower aperture, one of the support brackets is mounted in the forward posthole and the other of the support brackets mounted in the rearward post hole on its associated truck bed side such that the tabs of both of said support brackets are positioned so that the upper apertures in both said support brackets are coaxially aligned and the lower apertures in both said support brackets are coaxially aligned, the pivot rod selectively of extending horizontally through the lower apertures in the tabs of the support brackets to prevent the camper shell from lifting from the truck bed sides until the rod is removed from the apertures, the pivot rod also capable of being removed from the support brackets on one of the sides to allow that side to be lifted and capable of being removed to the upper apertures of the support brackets when the opposite of the truck bed sides is to be lifted.

3. The pivoting device for pick-up truck camper shells as set forth in claim 2 and further including a chain secured between one of the truck bed side walls and one of the lower flanges of the camper shell.

4. The pivoting device for pick-up truck camper shells as set forth in claim 3, wherein the lower end of each of the support brackets is a square-cross sectioned tube, dimensioned to fit snugly within the post holes.

* * * * *